(12) United States Patent
Bortoli et al.

(10) Patent No.: US 11,572,193 B2
(45) Date of Patent: Feb. 7, 2023

(54) EJECTION JACK HAVING A TOGGLE ASSEMBLY

(71) Applicant: Hamilton Sundstrand Corporation, Charlotte, NC (US)

(72) Inventors: Stephen Michael Bortoli, Roscoe, IL (US); Gary Sasscer, Leaf River, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 1512 days.

(21) Appl. No.: 15/788,420

(22) Filed: Oct. 19, 2017

(65) Prior Publication Data

US 2018/0057186 A1 Mar. 1, 2018

Related U.S. Application Data

(62) Division of application No. 15/067,936, filed on Mar. 11, 2016, now Pat. No. 9,821,919.

(51) Int. Cl.
*B64D 41/00* (2006.01)
*F16C 11/10* (2006.01)

(52) U.S. Cl.
CPC ............ *B64D 41/007* (2013.01); *F16C 11/10* (2013.01)

(58) Field of Classification Search
CPC combination set(s) only.
See application file for complete search history.

(56) References Cited

U.S. PATENT DOCUMENTS

| | | | |
|---|---|---|---|
| 3,273,459 A | 9/1966 | Lardin | |
| 4,676,458 A | 6/1987 | Cohen | |
| 4,717,095 A | 1/1988 | Cohen et al. | |
| 5,915,765 A * | 6/1999 | Sternberger | ........... B64D 29/06 24/270 |
| 5,984,382 A * | 11/1999 | Bourne | ................. E05C 19/145 292/DIG. 31 |
| 6,189,832 B1 | 2/2001 | Jackson | |

(Continued)

FOREIGN PATENT DOCUMENTS

| | | |
|---|---|---|
| EP | 0839714 A1 | 5/1998 |
| EP | 1245769 A2 | 10/2002 |

(Continued)

OTHER PUBLICATIONS

FR Search Report and Written Opinion for Application No. FR1751970, dated Mar. 3, 2020, 6 pages.

*Primary Examiner* — Monica E Millner
(74) *Attorney, Agent, or Firm* — Cantor Colburn LLP

(57) ABSTRACT

A toggle assembly includes a first joint member having a first lug and a second lug, a second joint member, and a third joint member. The second joint member has a first arm that receives a first rolling element, a second arm that receives a second rolling element, a third arm, and a fourth arm. The second joint member is pivotally connected to the first joint member via a first pin that extends through the first lug, the first rolling element, the second rolling element, and the second lug. The third joint member has a third lug and a fourth lug disposed opposite the third lug. The third joint member is pivotally connected to the second joint member via a cross rod pin that extends through the third lug, the third arm and the fourth arm.

5 Claims, 4 Drawing Sheets

(56) References Cited

U.S. PATENT DOCUMENTS

| | | | |
|---|---|---|---|
| 6,325,428 B1* | 12/2001 | Do | E05C 19/14 |
| | | | 244/129.4 |
| 6,331,099 B1 | 12/2001 | Eccles et al. | |
| 6,386,598 B1* | 5/2002 | Dykstra | B65D 90/008 |
| | | | 292/201 |
| 6,629,712 B2 | 10/2003 | Jackson | |
| 10,458,280 B2* | 10/2019 | Sawyers-Abbott | F02K 1/763 |
| 2013/0330121 A1 | 12/2013 | Sasscer | |
| 2016/0016668 A1* | 1/2016 | Danet | F16B 2/185 |
| | | | 248/188.9 |
| 2016/0377154 A1* | 12/2016 | Trybula | F16H 35/00 |
| | | | 74/99 R |

FOREIGN PATENT DOCUMENTS

| | | | |
|---|---|---|---|
| EP | 3348486 A1 | 7/2018 | |
| FR | 3035453 A1 | 10/2016 | |
| WO | 9951490 A1 | 10/1999 | |

\* cited by examiner

EJECTION JACK HAVING A TOGGLE ASSEMBLY

CROSS-REFERENCE TO RELATED APPLICATIONS

This application is a divisional of U.S. patent application Ser. No. 15/067,936, filed Mar. 11, 2016, the disclosure of which is incorporated by reference herein in its entirety.

BACKGROUND

The present disclosure relates to an ejection jack having a toggle assembly.

Some aircraft are provided with a backup power source that may be air driven or ram air driven. The backup power source is sometimes referred to as a ram air turbine and is movable between a stowed position in which the ram air turbine is received within the aircraft fuselage and a deployed position in which the ram air turbine is disposed outside of the aircraft fuselage. The ram air turbine is deployed and/or retracted by an ejection jack.

SUMMARY

According to an embodiment of the present disclosure, a toggle assembly is provided. The toggle assembly includes a first joint member, a second joint member, and a third joint member. The first member has a first lug and a second lug. The second joint member has a first arm that receives a first rolling element, a second arm that receives a second rolling element, a third arm, and a fourth arm. The first arm and the second arm are disposed between the first lug and the second lug. The second member is pivotally connected to the first joint member via a first pin that extends through the first lug, the first rolling element, the second rolling element, and the second lug. The third joint member has a third lug and a fourth lug disposed opposite the third lug. The third lug is disposed between the third arm and the fourth arm. The third joint member is pivotally connected to the second joint member via a cross rod pin that extends through the third lug, the third arm and the fourth arm.

According to another embodiment of the present disclosure, an ejection jack is provided. The ram air deployment assembly includes a toggle assembly that is operably coupled to a ram air turbine actuator. The toggle assembly includes a first member, a second joint member, a first rolling element, a second rolling element, and a first pin. The first joint member as a base portion fixedly positioned on the housing, a first lug extending from the base portion, a second lug extending from the base portion and spaced apart from the first lug. The second joint member as a first arm extending from a central portion towards the first joint member, a second arm extending from the central portion towards the first joint member, a third arm extending from the central portion away from the first remember, a fourth arm extending from the central portion away from the first remember. The first arm and the second arm of the second joint member are disposed between the first lug and the second lug. The first rolling element is received within the first arm and the second rolling element is received within the second arm. The first and extends along the first axis through the first lug, the first rolling element, the second lug, and the second rolling element.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the invention will be described with reference to specific embodiments, without limiting same, it is to be understood that the disclosed embodiments are merely illustrative of the invention that may be embodied in various and alternative forms. Various elements of the disclosed embodiments may be combined or omitted to form further embodiments of the invention. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Throughout this specification, the term "attach," "attachment," "connected", "coupled," "coupling," "mount," or "mounting" shall be interpreted to mean that a structural component or element is in some manner connected to or contacts another element, either directly or indirectly through at least one intervening structural element, or is integrally formed with the other structural element.

Figure 1:
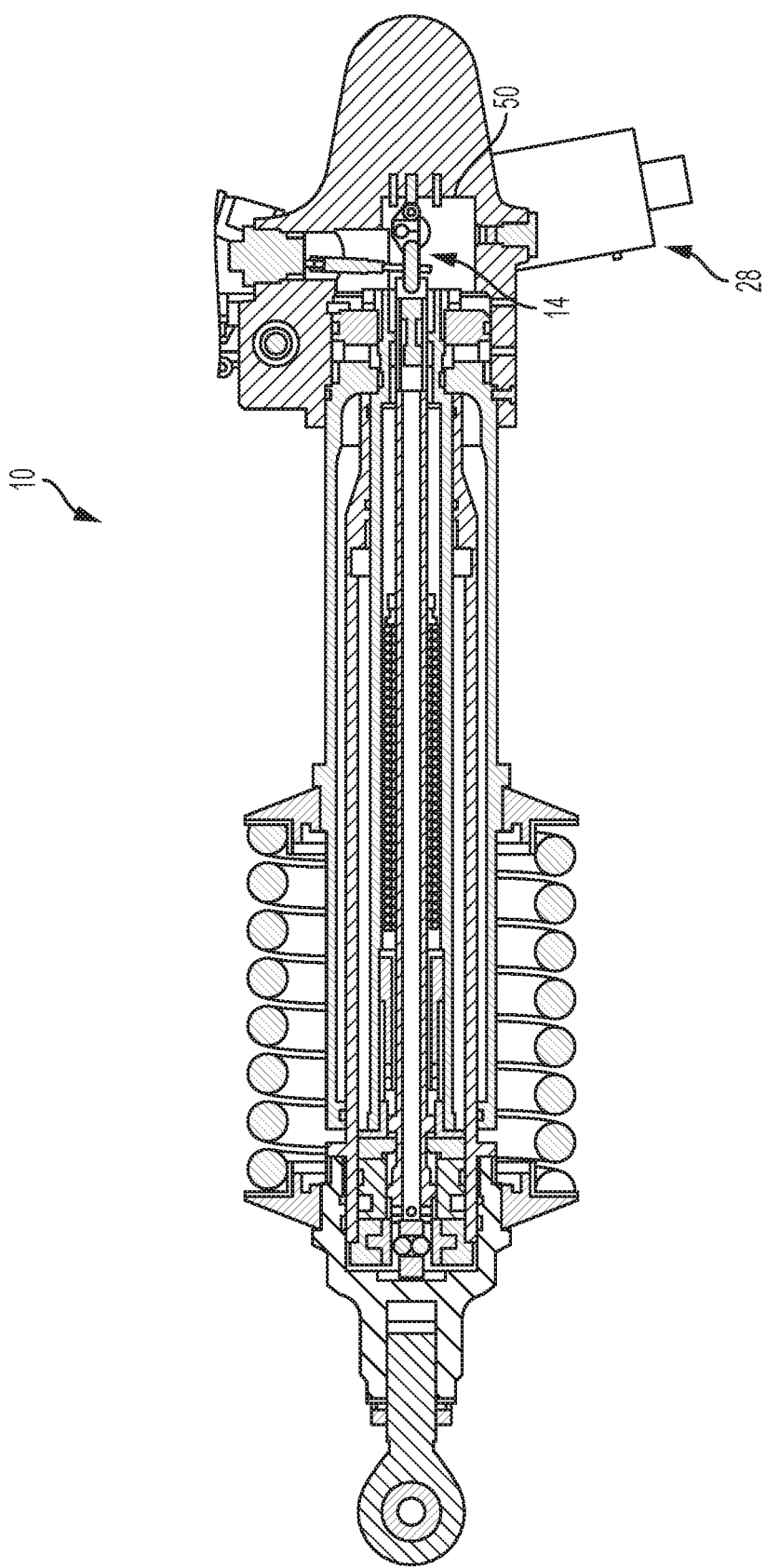
FIG. 1 is a side cutaway view of an ejection jack.

Referring to FIG. 1, an ejection jack 10 is shown. The ejection jack 10 is operably connected to a ram air turbine at a first end. The ram air turbine is movable between a stowed position and a deployed position via the ejection jack 10. The ram air turbine, when in the deployed position interacts with a moving airstream to provide power either electrical or hydraulic to an aircraft. The ejection jack 10 includes a toggle assembly 14.

The ejection jack 10 is operably connected to the toggle assembly 14. The ejection jack 10 is configured to move the ram air turbine between the stowed position, in which the ram air turbine does not interact with the moving airstream, and the deployed position, in which the ram air turbine interacts with the moving airstream. The toggle assembly 14 is movable between a lock position and an unlock position. The toggle assembly 14 while in the lock position aids in maintaining the ram air turbine in the retracted position. The toggle assembly 14 while in the unlock position enables the ram air turbine to be either deployed into the air stream or retracted by the ejection jack 10 into the aircraft fuselage or body such that the ram air turbine achieves the stowed position.

The toggle assembly 14 includes multiple pivot joints or pivot points that are susceptible to friction. The friction at these pivot points may impact the amount of force available to a component of the toggle assembly 14. The amount of force available to the component of the toggle assembly 14 may be the amount of force available from an actuator or solenoid associated with the toggle assembly 14 subject to a total distance that the toggle assembly 14 may travel to lock and/or unlock. To ensure adequate stroke availability and force margin, shims may be applied to the actuator or solenoid associated with the toggle assembly 14. The shimming process is fairly iterative and time-consuming. Therefore, the reduction of friction at the pivot points may reduce the need to apply shims, may increase stroke availability, may increase force margins, and may potentially reduce the size of actuators or solenoids associated with the toggle assembly 14.

The toggle assembly 14 is fixedly positioned at a first end to a housing of the ejection jack 10 and is slidably received at a second end within a piston cylinder of the ejection jack 10.

Figure 2:
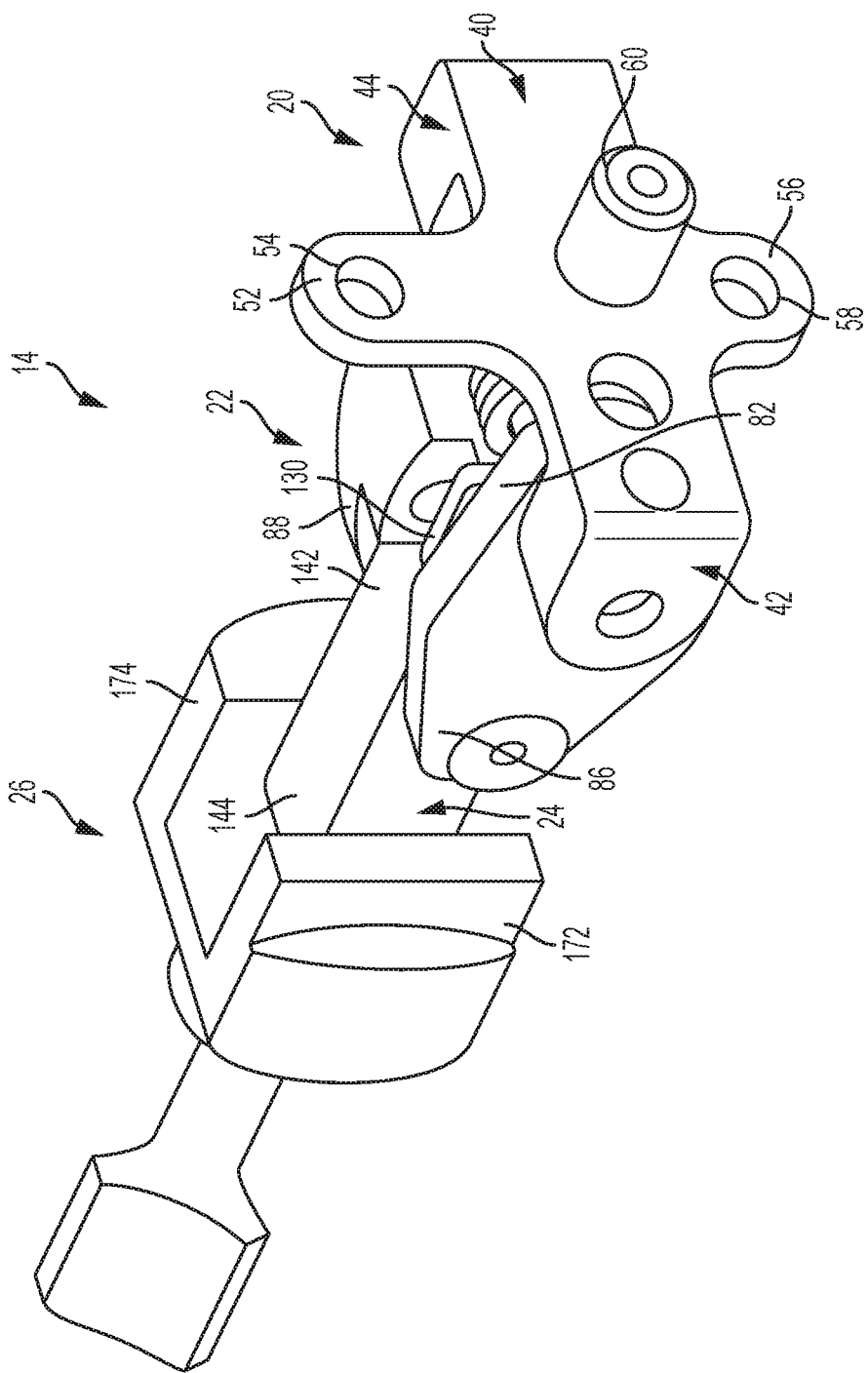
FIG. 2 is a perspective view of a toggle assembly of the ejection jack.
Figure 3:
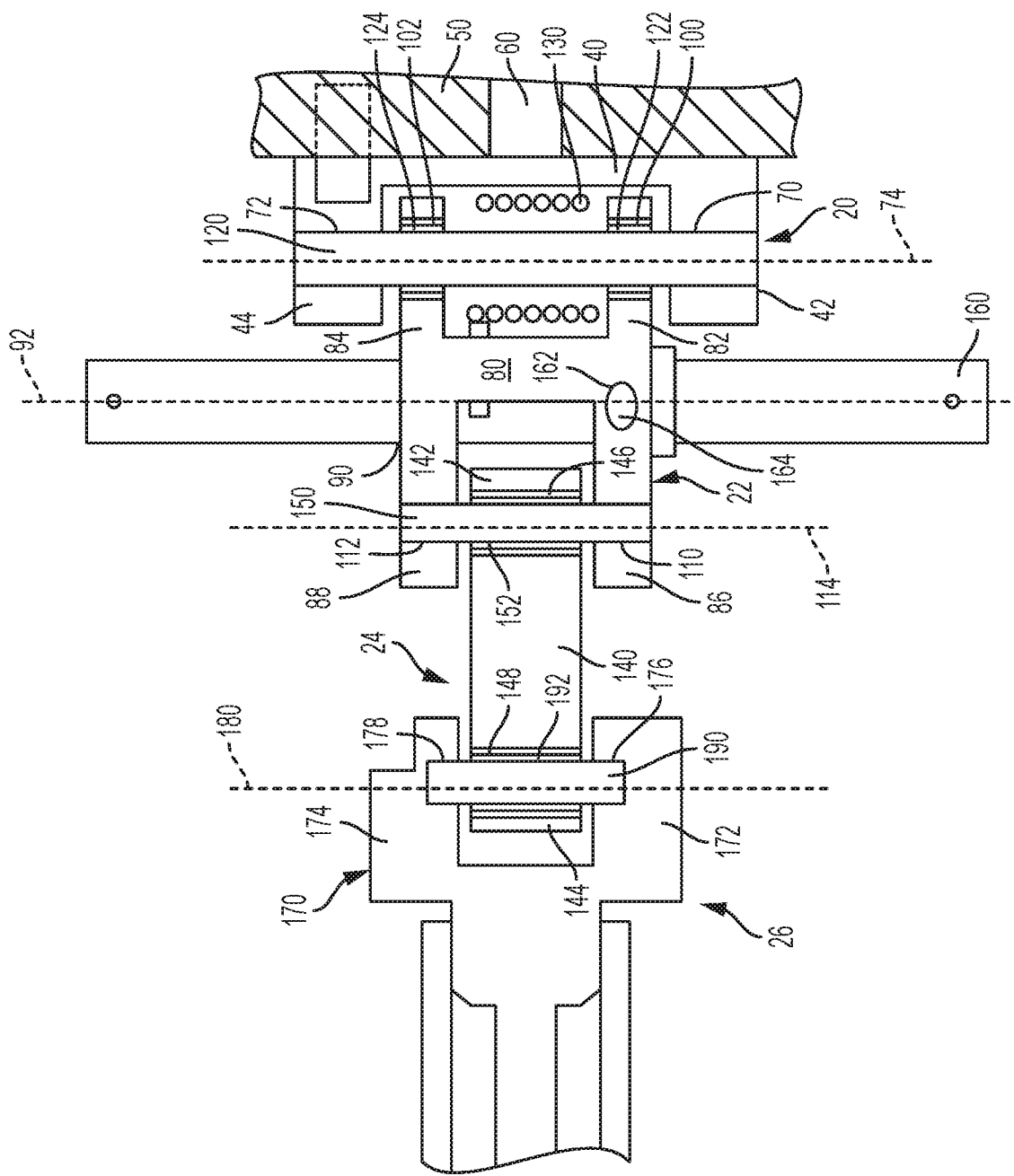
FIG. 3 is a top view of the toggle assembly of the ejection jack.
Figure 4:
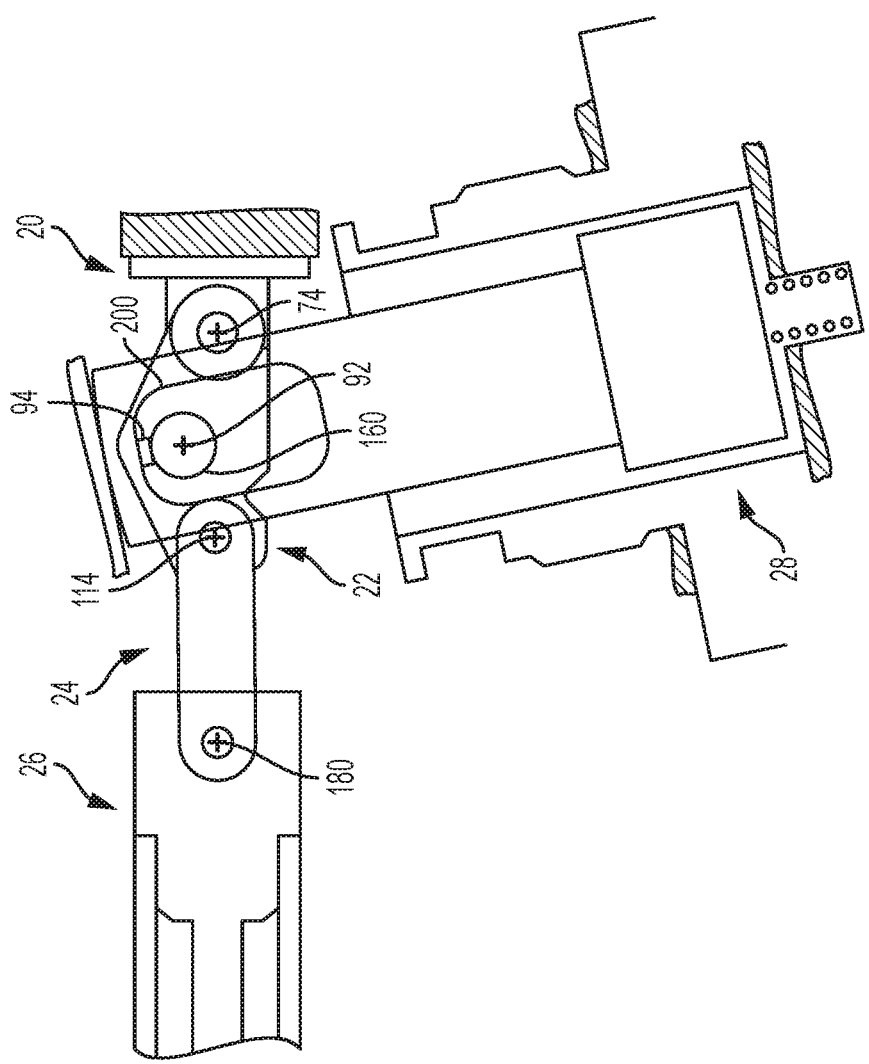
FIG. 4 is a side view of the toggle assembly of the ejection jack.

Referring to FIGS. 2-4, the toggle assembly 14 includes a first joint member 20, a second joint member 22, a third joint member 24, a lock piston 26, and an actuator 28. The first joint member 20 includes a base portion 40, a first lug 42, and a second lug 44. The base portion 40 is fixedly positioned on the housing 50 of the ejection jack 10. The base portion 40 is configured as a mounting base having a first mounting flange 52 having a first mounting hole 54, a second mounting flange 56 having a second mounting hole 58, and a mounting stud 60 disposed between the first mounting flange 52 and the second mounting flange 56. The second mounting flange 56 being disposed opposite the first mounting flange 52. The mounting stud 60 extends into the housing 50.

The first lug 42 extends from the base portion 40, away from the housing 50. The first lug 42 defines a first lug opening 70. The second lug 44 is spaced apart from the first lug 42. The second lug 44 extends from the base portion 40, away from the housing 50. The second lug 44 defines a second lug opening 72. The first lug opening 70 and the second lug opening 72 extend along a first axis 74. The first lug 42 and the second lug 44 are arranged such that the first joint member 20 is configured as a clevis.

The second joint member 22 includes a central portion 80, a first arm 82, a second arm 84, a third arm 86, and a fourth arm 88. The central portion 80 defines a central opening 90. The central opening 90 extends along a second axis 92. The first axis 74 and the second axis 92 are disposed parallel to each other but are not coplanar. The central portion 80 defines a cross rod stop 94. The cross rod stop 94 is disposed proximate the central opening 90. The cross rod stop 94 extends from a side surface of the central portion 80 and is disposed substantially parallel to the second axis 92. The cross rod stop 94 is configured as a protrusion, arm, or other extension like member that project from the side surface of the central portion 80.

The first arm 82 extends from the central portion 80 towards the first joint member 20. The first arm 82 defines a first arm opening 100. The first arm opening 100 extends completely through the first arm 82. In at least one embodiment, the first arm opening 100 is configured as a blind hole that extends partially through the first arm 82. The second arm 84 is spaced apart from the first arm 82. The second arm 84 extends from the central portion 80 towards the first joint member 20. The second arm 84 defines a second arm opening 102. The second arm opening 102 extends completely through the second arm 84. In at least one embodiment, the second arm opening 102 is configured as a blind hole that extends partially through the second arm 84. The first arm 82 and the second arm 84 are disposed between the first lug 42 and the second lug 44 such that the first lug opening 70, the first arm opening 100, the second lug opening 72, and the second arm opening 102 are proximately aligned along the first axis 74.

The third arm 86 extends from the central portion 80 away from the first joint member 20. The third arm 86 defines a third arm opening 110. The third arm opening 110 extends completely through the third arm 86. In at least one embodiment, the third arm opening 110 is configured as a blind hole that extends partially through the third arm 86. The fourth arm 88 is spaced apart from the third arm 86. The fourth arm 88 extends from the central portion 80 away from the first joint member 20. The fourth arm 88 defines a fourth arm opening 112. The fourth arm opening 112 extends completely through the fourth arm 88. In at least one embodiment, the fourth arm opening 112 is configured as a blind hole that extends partially through the fourth arm 88. The third arm opening 110 and the second arm opening 102 extend along a third axis 114.

The first joint member 20 is pivotally to the second joint member 22 by a first pin 120 that extends along the first axis 74 through openings of the first joint member 20 and the second joint member 22. In order to reduce friction at the joint, rolling elements are provided. These rolling elements are configured as roller bearings, needle bearings, ball bearings, low friction rotatable members, or the like. A first rolling element 122 and a second rolling element 124 are provided. The first rolling element 122 is received within at least one of the first lug opening 70 and the first arm opening 100. The second rolling element 124 is received within at least one of the second lug opening 72 and the second arm opening 102. The first pin 120 extends along the first axis 74 through the first lug opening 70 of the first lug 42, the first arm opening 100 of the first arm 82, the second arm opening 102 of the second arm 84, and the second lug opening 72 of the second lug 44 to pivotally connect the first joint member 20 and the second joint member 22.

In at least one embodiment, a biasing member 130 is provided. The biasing member 130 is disposed about the first pin 120 and is disposed between the first arm 82 and the second arm 84. The biasing member 130 engages at least one of the second joint member 22 and the base portion 40.

The third joint member 24 extends between the second joint member 22 and the lock piston 26. The third joint member 24 includes an elongate body 140 that extends between a third lug 142 and a fourth lug 144 disposed opposite the third lug 142. The third lug 142 defines a third lug opening 146. The third lug opening 146 extends completely through the third lug 142. The fourth lug 144 defines a fourth lug opening 148. The fourth lug opening 148 extends completely through the fourth lug 144.

The third lug 142 is disposed between the third arm 86 and the fourth arm 88 such that the third lug opening 146 is proximately aligned with the third arm opening 110 and the fourth arm opening 112 along the third axis 114. The third joint member 24 is pivotally connected to the second joint member 22 by a cross rod pin 150 that extends along the third axis 114. A third rolling element 152 is provided. The third rolling element 152 is received within at least one of the third lug opening 146, the third arm opening 110, and the fourth arm opening 112. The third rolling element 152 is disposed about the cross rod pin 150. The cross rod pin 150 extends along the third axis 114 through the third arm opening 110 of the third arm 86, the third lug opening 146 of the third lug 142, and the fourth arm opening 112 of the fourth arm 88 to pivotally connect the second joint member 22 and the third joint member 24.

The cross rod pin 150 is provided with a cross rod 160. The cross rod 160 is a generally elongate member, having at substantially cylindrical cross-section, that extends along the second axis 92 through the central opening 90 of the central portion 80. The cross rod 160 includes a cross rod arm that is disposed substantially parallel to the central portion 80 of the second joint member 22. The cross rod pin 150 extends from the cross rod arm and extends into an opening of the second joint member 22. In at least one embodiment, the cross rod 160 includes an opening 162 that receives a set screw 164 that extends at least partially through the cross rod 160 and is received at least partially within a central portion opening 166.

The lock piston 26 extends into a piston tube of the ejection jack 10. The lock piston 26 includes a mounting portion 170 that extends away from the piston tube of the ejection jack 10. The mounting portion 170 has a first mounting lug 172 and a second mounting lug 174. The first mounting lug 172 defines a first mounting lug opening 176. The first mounting lug opening 176 extends completely through the first mounting lug 172. In at least one embodiment, the first mounting lug opening 176 is configured as a blind hole that extends partially through the first mounting lug 172. The second mounting lug 174 is spaced apart from the first mounting lug 172. The second mounting lug 174 defines a second mounting lug opening 178. The second mounting lug opening 178 extends completely through the second mounting lug 174. In at least one embodiment, the second mounting lug opening 178 is configured as a blind hole that extends partially through the second mounting lug 174. The first mounting lug opening 176 and the second mounting lug opening 178 extend along a fourth axis 180.

The fourth lug 144 is disposed between the first mounting lug 172 and the second mounting lug 174 such that the fourth lug opening 148, the first mounting lug opening 176, and the second mounting lug opening 178 proximately aligned along the fourth axis 180. The third joint member 24 and the lock piston 26 are pivotally connected to each other by a second pin 190 that extends along the fourth axis 180. A fourth rolling element 192 has provided. The fourth rolling element 192 is received within at least one of the fourth lug opening 148, the first mounting lug opening 176, and the second mounting lug opening 178. The fourth rolling element 192 is disposed about the second pin 190. The second pin 190 extends along the fourth axis 180 through the first mounting lug opening 176 of the first mounting lug 172, the fourth lug opening 148 of the fourth lug 144, and the second mounting lug opening 178 of the second mounting lug 174.

The actuator 28 includes a window 200 formed in a housing of the actuator 28 that supports the toggle assembly 14. The window 200 is sized to allow the toggle assembly 14 room to move between the lock position and the unlock position. The actuator 28 is configured to move the second joint member 22 and ultimately the toggle assembly 14 between an unlock position and a lock position. The unlock position corresponds to the extended position of the ejection jack 10. The lock position corresponds to the retracted position of the ejection jack 10.

The cross rod stop 94 is formed within an upper portion of the window 200. The cross rod 160 rests against the cross rod stop 94 when the toggle assembly is in the locked position. The toggle assembly 14 is biased, by the biasing member 130, to rest against the cross rod stop 94.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A toggle assembly, comprising:
   a first joint member having a first lug and a second lug;
   a second joint member having a first arm that receives a first rolling element, a second arm that receives a second rolling element, a third arm, and a fourth arm, the first arm and the second arm being disposed between the first lug and the second lug, the second joint member pivotally connected to the first joint member via a first pin that extends through the first lug, the first rolling element, the second rolling element, and the second lug;
   a third joint member having a third lug and a fourth lug disposed opposite the third lug, the third lug being disposed between the third arm and the fourth arm, the third joint member pivotally connected to the second joint member via a cross rod pin that extends through the third lug, the third arm, and the fourth arm;
   a lock piston having a mounting portion that includes a first mounting lug and a second mounting lug, the fourth lug disposed between the first mounting lug and the second mounting lug, the lock piston pivotally connected to the third joint member via a second pin that extends through the first mounting lug, the fourth lug, and the second mounting lug.

2. The toggle assembly of claim 1, further comprising a cross rod that extends through the second joint member.

3. The toggle assembly of claim 2, further comprising a third rolling element that is received within the third lug and disposed about the cross rod pin.

4. The toggle assembly of claim 2, further comprising a fourth rolling element that is received within the fourth lug and disposed about the second pin.

5. The toggle assembly of claim 2, further comprising an actuator connected to at least one of the cross rod and the second joint member, the actuator configured to move the second joint member and the lock piston between an unlock position and a lock position.

* * * * *